United States Patent
Xu et al.

(10) Patent No.: US 11,549,835 B2
(45) Date of Patent: Jan. 10, 2023

(54) METHOD FOR ANALYZING THE EXPANSIVE STRESS AND EXPANSIVE STRAIN OF TUNNEL SURROUNDING ROCK

(71) Applicant: Research Institute of Highway Ministry of Transport, Beijing (CN)

(72) Inventors: Chongbang Xu, Beijing (CN); Xiaojing Gao, Beijing (CN); Lei Li, Beijing (CN); Youlin Qin, Beijing (CN); Xuan Zhang, Beijing (CN)

(73) Assignee: RESEARCH INSTITUTE OF HIGHWAY MINISTRY OF TRANSPORT, Beijing (CN)

( * ) Notice: Subject to any disclaimer, the term of this patent is extended or adjusted under 35 U.S.C. 154(b) by 0 days.

(21) Appl. No.: 17/713,011

(22) Filed: Apr. 4, 2022

(65) Prior Publication Data
US 2022/0326053 A1 Oct. 13, 2022

(51) Int. Cl.
*G01D 21/02* (2006.01)
*G01N 3/08* (2006.01)

(52) U.S. Cl.
CPC ............... *G01D 21/02* (2013.01); *G01N 3/08* (2013.01); *G01N 2203/0075* (2013.01)

(58) Field of Classification Search
CPC .......... G01L 5/00; G01N 3/18; G01N 23/046; G01N 3/02; G01N 15/0806; G01N 19/04; G01N 3/08; G01N 2203/0075; G01N 3/12; G01V 1/18; E21F 17/00; G01D 21/02
See application file for complete search history.

(56) References Cited

FOREIGN PATENT DOCUMENTS

| CN | 111379567 A | * | 7/2020 | ............ E21D 11/00 |
| CN | 111504252 B | * | 7/2021 | ............ G01B 21/32 |

OTHER PUBLICATIONS

Notice of Allowance for Chinese Patent App. No. 202110360945. 4A (dated Oct. 13, 2021) with English Translation.
Office Action dated Aug. 11, 2021 for Chinese Patent App. No. 202110360945.4A with English Translation.
Amendment dated Sep. 6, 2021 for Chinese Patent App. No. 202110360945.4A with English Translation.
Claims originally filed on Apr. 2, 2021 for Chinese Patent App. No. 202110360945.4A with English Translation.

* cited by examiner

*Primary Examiner* — Brandi N Hopkins
(74) *Attorney, Agent, or Firm* — Kenealy Vaidya LLP

(57) ABSTRACT

Provided is a method for analyzing the expansive stress and expansive strain of tunnel surrounding rock, including: (1) determining the surrounding rock state of the tunnel surrounding rock before expansion and the surrounding rock state after expansion; (2) according to the determined state of the surrounding rock, determining the expansive stress and expansive strain of the tunnel surrounding rock before expansion, and determining the expansive stress and expansive strain of the tunnel surrounding rock after expansion; (3) according to the surrounding rock state of the tunnel surrounding rock after expansion, determining the expansive deformation radius of the tunnel surrounding rock, so as to determine the expansive deformation displacement of the tunnel surrounding rock.

6 Claims, 2 Drawing Sheets

METHOD FOR ANALYZING THE EXPANSIVE STRESS AND EXPANSIVE STRAIN OF TUNNEL SURROUNDING ROCK

TECHNICAL FIELD

The present disclosure relates to tunnel engineering technology field, and in particular, to a method for analyzing the expansive stress and expansive strain of tunnel surrounding rock.

BACKGROUND

In tunnel engineering, the analysis of expansive stress and expansive strain of tunnel surrounding rock is the basis of tunnel stability control technology. Due to the complexity of the surrounding rock state of the tunnel surrounding rock, the analysis of expansive stress and expansive strain is always the focus of tunnel engineering. In particular, for expansive rock tunnel engineering, expansive rock has expansive stress and expansive strain under the action of groundwater, which leads to a high risk of instability of tunnel lining structure. Among them, rock expansion is a special mechanical behavior, and the relationship between expansive stress and expansive strain is affected and restricted by rock water content and stress environment. However, in the existing theoretical analysis, rock expansion can only be reflected as expansive stress, not as expansive strain, which leads to a certain gap between the theoretical analysis and the actual engineering in the distribution regularity of expansive stress and expansive strain of tunnel surrounding rock in expansive rock tunnel, which is difficult to meet the needs of the project.

Therefore, in expansive rock tunnel engineering, it is necessary to find a method to analyze expansive stress and expansive strain of tunnel surrounding rock, which not only has urgent research value, but also has good economic benefit and industrial application potential.

SUMMARY

The present disclosure aims to provide a method for analyzing the expansive stress and expansive strain of tunnel surrounding rock, which can solve the problem in the prior art that there is a certain gap between the theoretical analysis and the actual engineering in the distribution regularity of expansive stress and expansive strain of tunnel surrounding rock in expansive rock tunnel.

According to an embodiment of the present disclosure, there is provided a method for analyzing the expansive stress and expansive strain of tunnel surrounding rock, comprising:

(1) determining surrounding rock state of tunnel surrounding rock before and after expansion, wherein the surrounding rock state of the tunnel surrounding rock before and after expansion are both elastic state; or the surrounding rock state of the tunnel surrounding rock before expansion is elastic state and the surrounding rock state of the tunnel surrounding rock after expansion is plastic state; or the surrounding rock state of the tunnel surrounding rock before and after expansion are both plastic states;

(2) according to the determined surrounding rock state, determining expansive stress and expansive strain of the tunnel surrounding rock before and after expansion; and (3) according to the surrounding rock state of the tunnel surrounding rock after expansion, determining the expansive deformation radius of the tunnel surrounding rock, so as to determine the expansive deformation displacement of the tunnel surrounding rock; wherein, the expansive deformation radius of the tunnel surrounding rock is the following distance:

after the expansion of the tunnel surrounding rock, within the distance of the expansive deformation radius from the tunnel wall, the tunnel surrounding rock has both expansive strain and expansive stress;

beyond the distance of the expansive deformation from the tunnel wall radius, the tunnel surrounding rock only occurs expansive stress without expansive strain; and, at the distance of the expansive deformation from the tunnel wall radius, the expansive stress of the tunnel surrounding rock is equal to the ground stress.

Preferably, determining the surrounding rock state of the tunnel surrounding rock before expansion comprises:

(1) in the case that the surrounding rock state of the tunnel surrounding rock after the lining is completed is elastic state, determining the expansive stress of the tunnel surrounding rock;

(2) according to Mohr-Coulomb yielding criteria, calculating numerical range of surrounding rock radius that needs to be satisfied by the surrounding rock state of the tunnel surrounding rock to enter the plastic state; and (3) comparing tunnel radius and the surrounding rock radius, when the maximum value of the numerical range is larger than the tunnel radius, the surrounding rock state of the tunnel surrounding rock before expansion is plastic state, and when the maximum value of the numerical range is smaller than the tunnel radius, the surrounding rock state of the tunnel surrounding rock before expansion is elastic state.

Preferably, determining the surrounding rock state of the tunnel surrounding rock after expansion comprises:

(1) calculating plastic zone radius of the tunnel surrounding rock; and (2) comparing the plastic zone radius with tunnel radius, and when the plastic zone radius is larger than the tunnel radius, determining the surrounding rock state of the tunnel surrounding rock after expansion is plastic state.

Preferably, in the case that the surrounding rock state of the tunnel surrounding rock before and after expansion are both elastic states, determining the expansive deformation radius $R_d$ of the tunnel surrounding rock according to the following formula:

$$R_d = r_0 \left( \frac{\sigma_0 - p_i}{\sigma_0 - \sigma_{pmax}} \right)^{0.5}$$

wherein, $r_0$ is tunnel radius, $\sigma_0$ is the crustal stress of the tunnel surrounding rock, $p_i$ is the lining support force provided by the tunnel support structure to the tunnel surrounding rock, $\sigma_{pmax}$ is maximum expansive force of the tunnel surrounding rock;

determining the expansive stress of the tunnel surrounding rock after expansion at the expansive deformation radius $R_d$ according to the following formula:

$$\sigma^*_r = 2\sigma_r$$

$$\sigma^*_\theta = 2\sigma_0$$

wherein, $\varepsilon_r$ is total radial stress of the tunnel surrounding rock at the expansive deformation radius $R_d$, $\sigma_r$ is radial stress of the tunnel surrounding rock after the crustal stress balance at the expansive deformation radius $R_d$, $\sigma^*_\theta$ is total tangential stress of the tunnel surrounding rock at the expansive deformation radius $R_d$;

determining the expansive strain of the tunnel surrounding rock after expansion according to the following formula:

$$\varepsilon^*_r = \varepsilon_r + D(N_d)\varepsilon_{ep}$$

wherein, $\varepsilon_r$ is radial linear strain of the tunnel surrounding rock in a condition of crustal stress, $\varepsilon^*_r$ is total radial strain of the tunnel surrounding rock, Nd is the capacity of the corresponding expansive deformation part of the tunnel surrounding rock during expansion, $D(N_d)\varepsilon_{ep}$ is the sum of the expansive strain of the tunnel surrounding rock after expansion and the expansive strain generated by the expansive stress of the tunnel surrounding rock after expansion.

Preferably, in the case that the surrounding rock state of the tunnel surrounding rock before expansion is elastic state and the surrounding rock state of the tunnel surrounding rock after expansion is plastic state, and a condition for the tunnel surrounding rock to enter the plastic state is the Mohr-Coulomb yielding criteria $$\sigma_\theta - \sigma_r > \frac{2\sin\varphi}{1-\sin\varphi}(\sigma_r + C\cot\varphi)$$

determining the expansive stress of the tunnel surrounding rock after expansion at the expansive deformation radius $R_d$ according to the following formula $$\sigma^*_r = (p_i + C\cot\varphi)\left(\frac{r}{r_0}\right)^{\frac{2\sin\varphi}{1-\sin\varphi}} - C\cot\varphi$$

$$\sigma^*_\theta = \frac{1+\sin\varphi}{1-\sin\varphi}(p_i + C\cot\varphi)\left(\frac{r}{r_0}\right)^{\frac{2\sin\varphi}{1-\sin\varphi}} - C\cot\varphi$$

wherein, $\sigma^*_r$ is total radial stress of the tunnel surrounding rock at the expansive deformation radius $R_d$, $\sigma^*_\theta$ is total tangential stress of the tunnel surrounding rock at the expansive deformation radius $R_d$, $\varphi$ is internal friction angle of the tunnel surrounding rock, $p_i$ is lining support force provided by the tunnel support structure to the tunnel surrounding rock, C is cohesion of the tunnel surrounding rock, $r_0$ is tunnel radius, r is radius of the tunnel surrounding rock;

when the maximum lateral confinement $\sigma_{pmax}$ of the expansive stress of the tunnel surrounding rock after expansion is smaller than the lining support force $p_i$ provided by the tunnel support structure to the tunnel surrounding rock, determining the plastic zone radius $R_p$ according to the following formula $$R_p = r_0\left[\frac{(1-\sin\varphi)(\sigma_0 + \sigma_p + C\cot\varphi)}{p_i + C\cot\varphi}\right]^{\frac{1-\sin\varphi}{2\sin\varphi}}$$

wherein, $r_0$ is the tunnel radius, $\varphi$ is the internal friction angle of the tunnel surrounding rock, $p_i$ is the lining support force provided by the tunnel support structure to the tunnel surrounding rock, C is the cohesion of the tunnel surrounding rock, $\sigma_0$ is crustal stress of the tunnel surrounding rock, $\sigma_p$ is expansive force of the tunnel surrounding rock;

when the maximum lateral confinement $\sigma_{pmax}$ of the expansive stress of the tunnel surrounding rock after expansion is larger than or equal to the lining support force $p_i$ provided by the tunnel support structure to the tunnel surrounding rock, determining the expansive deformation radius $R_d$ of the tunnel surrounding rock according to the following formula:

$$R_d = r_0\left(\frac{2\sigma_{pmax} + C\cot\varphi}{p_i + C\cot\varphi}\right)^{\frac{1-\sin\varphi}{2\sin\varphi}}$$

wherein, $r_0$ is the tunnel radius, $\varphi$ is the internal friction angle of the tunnel surrounding rock, $p_i$ is the lining support force provided by the tunnel support structure to the tunnel surrounding rock, C is the cohesion of the tunnel surrounding rock, $\sigma_{pmax}$ is a maximum expansive force of the tunnel surrounding rock;

determining the plastic zone radius $R_p$ according to the following formula:

$$R_p = r_0\left[\frac{(2\sigma_0 + C\cot\varphi)(1-\sin\varphi)}{(p_i + C\cot\varphi)(1+\sin\varphi)}\right]^{\frac{1-\sin\varphi}{2\sin\varphi}}$$

wherein, $r_0$ is the tunnel radius, $\varphi$ is the internal friction angle of the tunnel surrounding rock, $p_i$ is the lining support force provided by the tunnel support structure to the tunnel surrounding rock, C is the cohesion of the tunnel surrounding rock, $\sigma_0$ is crustal stress of the tunnel surrounding rock;

determining the expansive deformation displacement $S_0$ of the tunnel surrounding rock according to the following formula:

$$S_0 = \int_{r_0}^{R_d} D(N_d)dr$$

wherein, $R_d$ is the expansive deformation radius, $r_0$ is the tunnel radius, $D(N_d)$ is the expansive strain of the tunnel surrounding rock after expansion.

Preferably, the surrounding rock state of the tunnel surrounding rock before and after expansion are both plastic states, determining the expansive stress of the tunnel surrounding rock at the expansive deformation radius $R_d$ after expansion according to the following formula:

$$\sigma^*_r = 2(p_i + C\cot\varphi)\left(\frac{r}{r_0}\right)^{\frac{2\sin\varphi}{1-\sin\varphi}} - 2C\cot\varphi$$

-continued $$\sigma_\theta^* = \frac{2\sin\varphi + 2}{1-\sin\varphi}(p_i + C\cot\varphi)\left(\frac{r}{r_0}\right)^{\frac{2\sin\varphi}{1-\sin\varphi}} - \frac{2}{1-\sin\varphi}C\cot\varphi$$

wherein, $\sigma_r^*$ is the total radial stress of the tunnel surrounding rock at the expansive deformation radius $R_d$, $\sigma_\theta^*$ is the total tangential stress of the tunnel surrounding rock at the expansive deformation radius $R_d$;

$\varphi$ is the internal friction angle of the tunnel surrounding rock, $p_i$ is the lining support force provided by the tunnel support structure to the tunnel surrounding rock, C is the cohesion of the tunnel surrounding rock, $r_0$ is tunnel radius, r is radius of the tunnel surrounding rock;

determining the expansive deformation displacement $S_0$ of the tunnel surrounding rock according to the following formula:

$$S_0 = \frac{r_0\sin\varphi(\sigma_0 + C\cot\varphi)}{2G}\left[\frac{(1-\sin\varphi)(\sigma_0 + C\cot\varphi)}{p_i + C\cot\varphi}\right]^{\frac{1-\sin\varphi}{\sin\varphi}} + \int_{r_0}^{R_d} D(N_d)dr$$

wherein, $R_d$ is the expansive deformation radius, $r_0$ is the tunnel radius, $\varphi$ is the internal friction angle of the tunnel surrounding rock, $p_i$ is the lining support force provided by the tunnel support structure to the tunnel surrounding rock, C is the cohesion of the tunnel surrounding rock, $\sigma_0$ is the crustal stress of the tunnel surrounding rock, $D(N_d)$ is the expansive strain of the tunnel surrounding rock after expansion, G is the shear modulus of the tunnel surrounding rock.

In the present disclosure, only expansive deformation radius is considered for the expansive stress and expansive strain of tunnel surrounding rock.

When surrounding rock radius r is equal to expansive deformation radius $R_d$.

$\sigma_p = \sigma_r = \sigma_{pmax}$ $N_d = 0$ $N_s = N_p = F(\delta)$ wherein, $\sigma_p$ is the actual expansive stress at a certain point in the tunnel surrounding rock, $\sigma_r$ is the radial stress at a certain point in the tunnel surrounding rock, $\sigma_{max}$ is the maximum expansive stress in the tunnel surrounding rock, $\Delta$ is the water content of the tunnel surrounding rock, $N_p$ is the expansion energy of the tunnel surrounding rock, $N_s$ is the energy of the expansive stress of the tunnel surrounding rock, $N_d$ is the energy of the expansive strain of the tunnel surrounding rock;

when the surrounding rock radius r is smaller than the expansive deformation radius $R_d$, $\sigma_p = \sigma_r < \sigma_{pmax}$ $N_d \neq 0$ $N_p = F(\delta) = N_s + N_d$ When the surrounding rock radius r is larger than the expansive deformation radius $R_d$, $\sigma_p = \sigma_{pmax} < \sigma_r$ $N_d = 0$ $N_s = N_p = F(\delta)$ It can be seen that when the surrounding rock radius r is larger than the expansive deformation radius $R_d$, the maximum expansive stress of the tunnel surrounding rock is smaller than the crustal stress, that is to say, surrounding rock expansion is consistent with the primary rock state, that is, it has not been affected by the tunnel excavation. Therefore, the analysis of the expansive stress and expansive strain of the surrounding rock of the expansive rock tunnel only considers the range when the surrounding rock radius r is smaller than the expansive deformation radius $R_d$.

Compared with the prior art, the beneficial effects of the present disclosure are as follows.

(1) The present disclosure introduces the expansive behavior characteristics of the tunnel surrounding rock into the analysis of the expansive stress and expansive strain of the tunnel surrounding rock of the expansive rock tunnel, which can truly reflect the changes of the expansive stress and expansive strain of the tunnel surrounding rock during the expansion process, and can realize the quantitative calculation of expansive stress and expansive strain on the change of surrounding rock state.

(2) The present disclosure comprehensively considers the expansion of the tunnel surrounding rock and the crustal stress environment of the tunnel surrounding rock, determines the conditions and mechanisms of different surrounding rock expansive behaviors, so then determines the expansive state, expansive stress and expansive strain of the tunnel surrounding rock at any point in the expansive rock tunnel.

(3) The present disclosure determines the concept and calculation method of the expansive deformation radius of the tunnel surrounding rock, thereby providing a theoretical basis for the determination of the expansive deformation displacement of the tunnel surrounding rock and the formulation of technical indicators.

BRIEF DESCRIPTION OF THE DRAWINGS

The drawings described herein provide a further understanding of the present disclosure, and form a part of the present application. The schematic embodiments of the present disclosure and the description thereof are used to explain the present disclosure, and do not limit the present disclosure. In the figures.

DETAILED DESCRIPTION OF EMBODIMENTS

Figure 1:
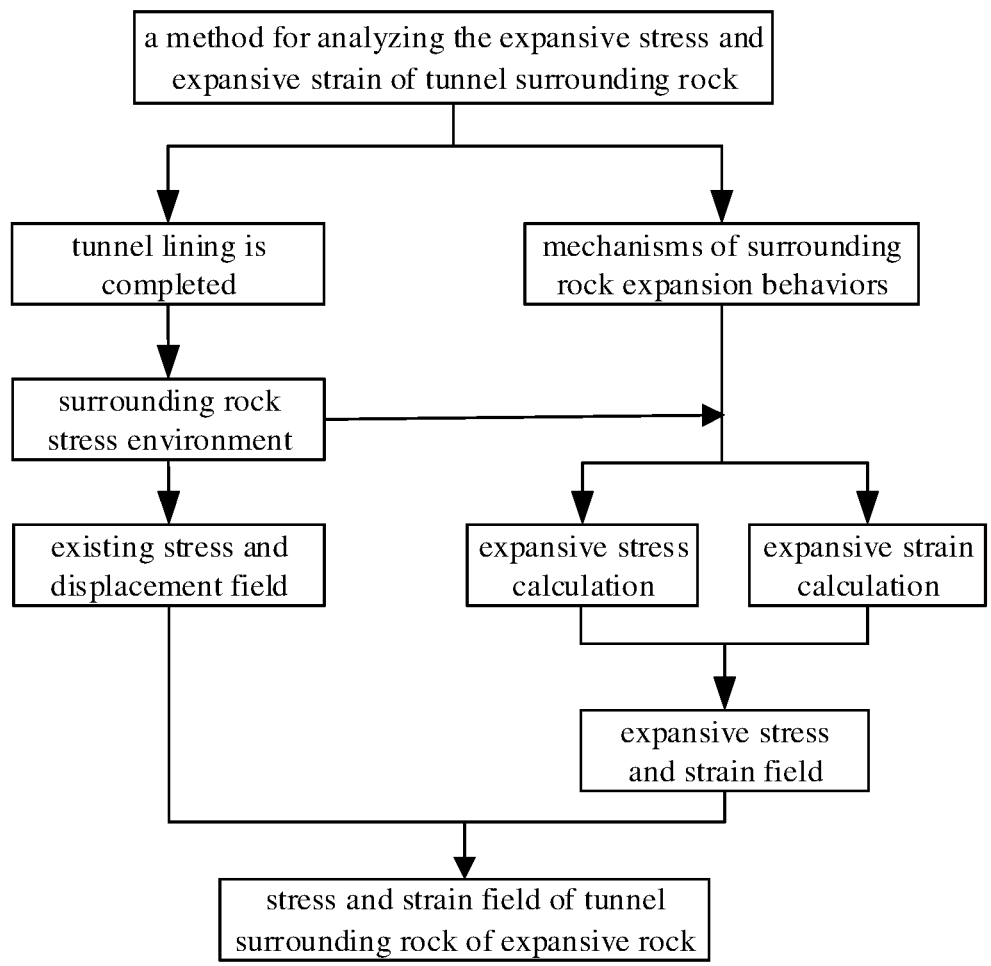
FIG. 1 is a flowchart according to an embodiment of the present disclosure.

Embodiments of the technical solutions of the present disclosure will be described in detail below with reference to the accompanying drawings. The following embodiments are only used to more clearly illustrate the technical solutions of the present disclosure, and are therefore only used as embodiments, and cannot be used to limit the protection scope of the present disclosure.

Embodiment 1

After the tunnel lining support is completed, the surrounding rock has expansive behavior under the action of groundwater. The expansive behavior is a limited behavior which include expansive deformation and expansive stress. The expansive behavior at a certain point in the tunnel surrounding rock is determined by the relationship between its stress environment state and the maximum confined expansive stress. The stress field and strain field generated by the expansion of surrounding rock is based on the existing stress and displacement field of the tunnel surrounding rock, and the two are independent with each other. The stability of surrounding rock after expansion depends on the expansive stress and the existing crustal stress.

Therefore, the premise of analyzing the stress and strain of the surrounding rock after expansion is to understand the surrounding rock state before expansion, and then obtain the stress and strain parameters of the surrounding rock before expansion, and then combine the surrounding rock state after expansion to determine the expansive deformation radius, and the tunnel displacement to clarify the expansive deformation control range of the tunnel surrounding rock.

When the tunnel surrounding rock expands, the adjustment of the primary rock stress field is completed. Under the influence of the primary rock crustal stress, the tunnel lining deformation and the surrounding rock deformation are completed, and both of them are in a stable state. The surrounding rock state includes:

(1) the tunnel surrounding rock is elastic state and not plastic state, and the tunnel stress is:

$$\sigma_r = \sigma_0\left(1 - \frac{r_0^2}{r^2}\right) + p_i\frac{r_0^2}{r^2};$$

$$\sigma_\theta = \sigma_0\left(1 + \frac{r_0^2}{r^2}\right) - p_i\frac{r_0^2}{r^2}$$

wherein:
$r_0$ is the tunnel excavation radius, meter;
$r$ is the radius at a certain point in the tunnel surrounding rock, meter;
$p_i$ is the lining support force provided by the tunnel support structure to the tunnel surrounding rock, kPa;
$\sigma_0$ is natural stress of rock, kPa;
$\sigma_r$ is the radial stress at a certain point in the tunnel surrounding rock, kPa;
$\sigma_\theta$ is the tangential stress at a certain point in the tunnel surrounding rock, kPa.

Tunnel strain is:

$$\varepsilon_r = \frac{1-\mu^2}{E}\left(\sigma_r - \frac{\mu}{1-\mu}\sigma_\theta\right);$$

$$\varepsilon_\theta = \frac{1\,\mu^2}{E}\left(\sigma_\theta - \frac{\mu}{1-\mu}\sigma_r\right);$$

wherein: $\varepsilon_r$, $\varepsilon_\theta$ are the radial and tangential linear strains at a certain point of tunnel surrounding rock under crustal stress condition, respectively.

(2) The tunnel surrounding rock is plastic state, and the stress at a certain point in the plastic zone of the tunnel surrounding rock and the displacement of the tunnel lining are as follows:

$$\sigma_r = (p_i + C\cot\varphi)\left(\frac{r}{r_0}\right)^{\frac{2\sin\varphi}{1-\sin\varphi}} - C\cot\varphi;$$

$$\sigma_\theta = \frac{1+\sin\varphi}{1-\sin\varphi}(p_i \mid C\cot\varphi)\left(\frac{r}{r_a}\right)^{\frac{2\sin\varphi}{1-\sin\varphi}} C\cot\varphi;$$

wherein:
C is the rock cohesion, kPa;
φ is the internal friction angle of rock;
tunnel plastic zone radius and tunnel displacement:

$$R_p = r_0\left[(1-\sin\varphi)\frac{\sigma_0 + C\cot\varphi}{p_i + C\cot\varphi}\right]^{\frac{1-\sin\varphi}{2\sin\varphi}};$$

$$S_0 = \frac{r_0\sin\varphi(\sigma_0 + C\cot\varphi)}{2G}\left[\frac{(1-\sin\varphi)(\sigma_0 + C\cot\varphi)}{p_i + C\cot\varphi}\right]^{\frac{1-\sin\varphi}{\sin\varphi}};$$

wherein,
$R_p$ is the plastic zone radius;
G is the shear modulus, kPa;
$S_0$ is the tunnel displacement, meter.

In the present disclosure, the rock expansion energy is fixed in the existing water environment, not unlimited expansion. The expansion energy can be expressed in the form of expansive strain alone, expansive stress alone, or a combination of the two, which can be expressed as:

$$N_p = F(\delta)$$

$$N_p = N_s + N_d$$

wherein,
δ is the rock water content;
$N_p$ is expansion energy, N.m;
$N_s$ is partial energy of expansive stress, N.m, $0 \leq N_s \leq N_p$;
$N_d$ is partial energy of expansive strain, N.m, $0 \leq N_d \leq N_p$.

The relationship between expansion energy, expansive stress and expansive strain is expressed as:

$$\varepsilon_{ep} = D(N_d)$$

$$\sigma_p = S(N_s)$$

Figure 2:
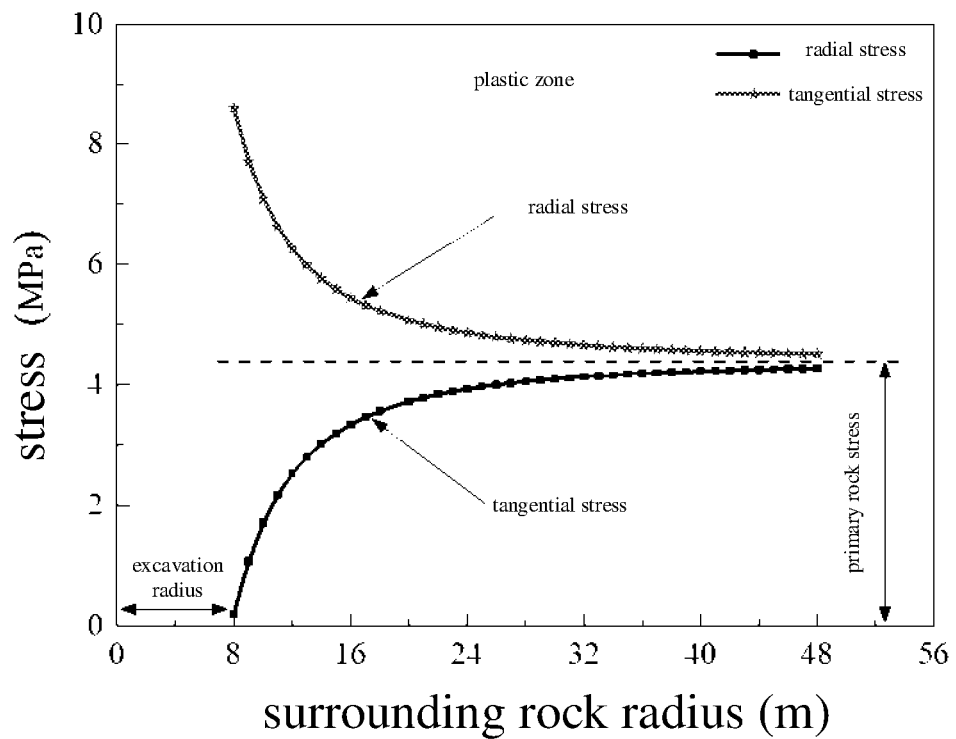
FIG. 2 is a schematic diagram of the stress distribution in which the surrounding rock state of the tunnel surrounding rock before and after expansion are both elastic states according to an embodiment of the present disclosure.
Figure 3:
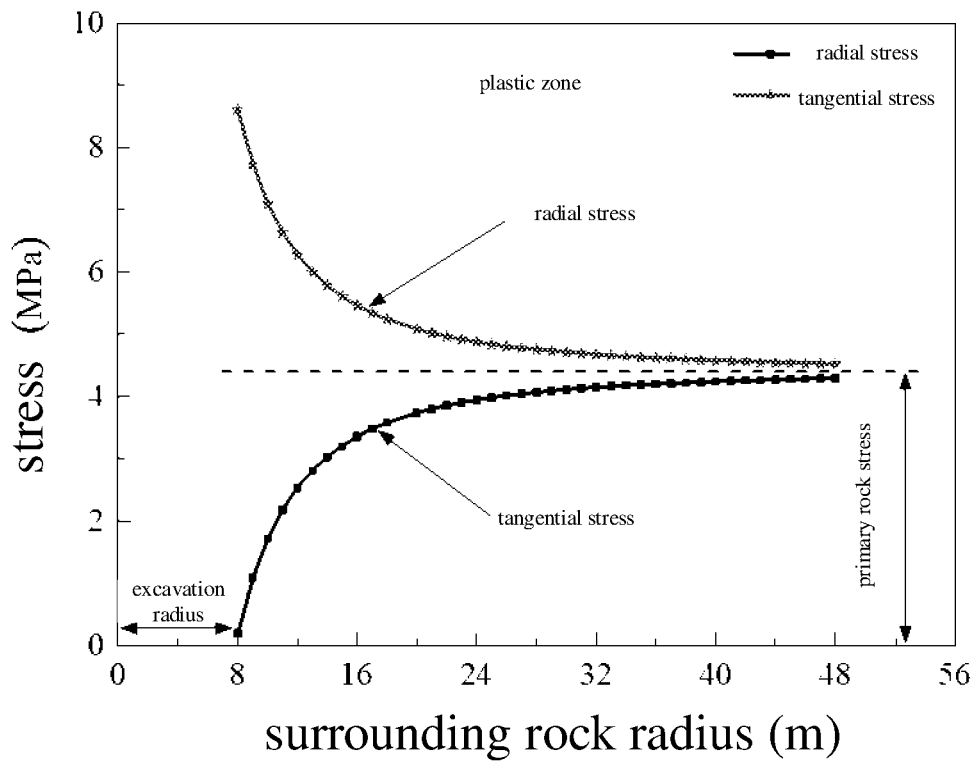
FIG. 3 is a schematic diagram of the stress distribution in which the surrounding rock state of the tunnel surrounding rock is elastic state before expansion and is plastic state after expansion according to an embodiment of the present disclosure.

The expansion of the tunnel surrounding rock belongs to confined expansion, and the tunnel surrounding rock can expand only in the radial direction, which is specifically expressed as:

(1) After the tunnel lining is completed, regardless of whether the surrounding rock is elastic state as shown in FIG. 2 or plastic state as shown in FIG. 3, the radial stress is smaller than the tangential stress. Therefore, the constraint of tangential stress on surrounding rock expansion is the same as that of the indoor rock specimen, and the expansive stress and expansive deformation only occur in the radial direction.

(2) When judging the expansive behavior of the surrounding rock, only the radial stress or is considered; only the radial direction for the displacement or strain of the surrounding rock is considered, and the tangential direction may not be considered.

The type of radial expansive behavior at a certain point in the tunnel surrounding rock depends on the comparation result of the crustal stress and the maximum confined expansive stress of the rock in the water-containing state at this point. it can be concluded that:

1) when the crustal stress $\sigma_r$ is larger than or equal to the maximum confined expansive stress $\sigma_{pmax}$ of the rock, the surrounding rock expansion is only expressed as expansive stress alone, which is expressed as:

$$N_d=0$$

$$N_s=N_p=F(\delta)$$

2) when the crustal stress $\sigma_r$ is smaller than the maximum confined expansive stress $\sigma_{pmax}$ of the rock, the surrounding rock expansion is in the form of a mixture of expansive stress and expansive strain, and the expansion energy is firstly released in the form of expansive stress. When the expansive force of the surrounding rock is equal to the crustal stress, the remaining expansion energy is then released in the form of expansive strain, which is expressed as:

$$N_d \neq 0$$

$$\sigma_p = \sigma_r$$

$$N_p = F(\delta) = N_s + N_d$$

wherein, $\sigma_p$ is the actual expansive stress at a certain point in the surrounding rock, kPa.

There is no situation in which the crustal stress of the surrounding rock of the tunnel is equal to zero, so there is no situation in which expansive strain alone for surrounding rock expansion.

The displacement at a certain point in the tunnel surrounding rock after expansion is composed of the existing displacement and the expansive displacement, which can be expressed as:

$$\varepsilon^*_r = \varepsilon_r + \varepsilon_{ep}$$

wherein, $\varepsilon^*_r$ is the total radial strain of the surrounding rock at a certain point;

$\varepsilon_{ep}$ is the total expansive strain of the surrounding rock at a certain point.

The stress at a certain point in the tunnel surrounding rock after expansion is composed of crustal stress and expansive stress, which can be expressed as:

$$\sigma^*_r = \sigma_r + \sigma_p$$

$$\sigma^*_\theta = \sigma_\theta + \sigma_p$$

wherein, $\sigma^*_r$ is the total radial stress of surrounding rock at a certain point;

$\sigma^*_\theta$ is the total tangential stress of surrounding rock at a certain point.

After the tunnel surrounding rock expands, the tunnel surrounding rock within a certain distance from the tunnel wall occurs both expansive strain and expansive stress, while the tunnel surrounding rock outside the certain distance from the tunnel wall occurs expansive stress only without expansive strain. This distance is called the expansive deformation radius of the tunnel surrounding rock. For the surrounding rock at the location of the expansive deformation radius, the expansive stress is equal to the ground stress. Thus, for the expansive strain and expansive stress, only the tunnel surrounding rock within the expansive deformation radius range should be considered. When the surrounding rock radius r is equal to the expansive deformation radius $R_d$, $$\sigma_p = \sigma_r = \sigma_{pmax}$$

$$N_d = 0$$

$$N_s = N_p = F(\delta)$$

wherein, $\sigma_{pmax}$ is the maximum confined expansive stress of rock;

$\sigma_r$ is the radial stress at a certain point in tunnel surrounding rock;

$\delta$ is the rock water content;

$N_p$ is the expansion energy;

$N_s$ is the expansive stress part energy;

$N_d$ is the expansive strain part energy;

$\sigma_p$ is the actual expansive stress at a certain point in the surrounding rock;

when the surrounding rock radius r is smaller than the expansive deformation radius $R_d$, $$\sigma_p = \sigma_r < \sigma_{pmax}$$

$$N_d \neq 0$$

$$N_p = F(\delta) = N_s + N_d$$

when the surrounding rock radius r is larger than the expansive deformation radius $R_d$, $$\sigma_p = \sigma_{pmax} < \sigma_r$$

$$N_d = 0$$

$$N_s = N_p = F(\delta)$$

wherein, when $r > R_d$, the maximum expansive stress of the surrounding rock is smaller than the crustal stress. It can be seen that surrounding rock expansion is not affected by the tunnel excavation, that is, it is consistent with the primary rock state. Therefore, the analysis of the expansive stress and expansive strain of the tunnel surrounding rock only considers the range of $r \leq R_d$.

The surrounding rock state of the tunnel surrounding rock before and after expansion include: the surrounding rock state before and after expansion are both elastic state; or the surrounding rock state before expansion is elastic state and the surrounding rock state after expansion is plastic state; or the surrounding rock state before and after expansion are both plastic states;

(1) When the surrounding rock is elastic state before and after expansion:

① Calculation of expansive deformation radius $R_d$

When calculating the expansive deformation radius, consider that the expansive deformation radius is equal to the surrounding rock radius, that is, when $r = R_d$, $$\sigma_r = \sigma_0\left(1 - \frac{r_0^2}{r^2}\right) + p_i \frac{r_0^2}{r^2} = \sigma_p = \sigma_{pmax}$$

which is:

$$R_d = r_0\left(\frac{\sigma_0 - p_i}{\sigma_0 - \sigma_{pmax}}\right)^{0.5}$$

② in the case of only considering r≤$R_d$, the surrounding rock stress is:

$$\sigma^*_r = 2\sigma_r$$

$$\sigma^*_\theta = 2\sigma_0$$

③ in the case of only considering r≤$R_d$, the surrounding rock strain is:

$$\varepsilon^*_r = \varepsilon_r + D(N_d)$$

The deformation displacement of the surrounding rock can be known from the surrounding rock strain.

(2) When the surrounding rock state before expansion is elastic state and the surrounding rock state after expansion is plastic state:

The tunnel surrounding rock changes from elastic state to plastic state, and the Mohr-Coulomb strength condition is used as the condition for the surrounding rock to enter the plastic state, which satisfies the formula:

$$\sigma_\theta - \sigma_r \geq \frac{2\sin\varphi}{1 - \sin\varphi}(\sigma_r + C\cot\varphi)$$

① when the maximum confined expansive stress of the rock is smaller than the lining support force provided by the tunnel support structure to the surrounding rock, i.e., $\sigma_{pmax} < p_i$, the surrounding rock stress is:

$$\sigma^*_r = \sigma_r + \sigma_p = (p_i + C\cot\varphi)\left(\frac{r}{r_0}\right)^{\frac{2\sin\varphi}{1-\sin\varphi}} - C\cot\varphi$$

$$\sigma^*_\theta = \sigma_\theta + \sigma_p = \frac{1 + \sin\varphi}{1 - \sin\varphi}(p_i + C\cot\varphi)\left(\frac{r}{r_0}\right)^{\frac{2\sin\varphi}{1-\sin\varphi}} - C\cot\varphi$$

since $\sigma_{pmax} < \sigma_r$, $N_d = 0$; $N_s = N_p = F(\delta)$, the surrounding rock expansion will not cause expansive deformation, so the expansive strain under this condition can be ignored. It is obtained under this condition:

$$\varepsilon_r = \frac{1 - \mu^2}{E}\left(\sigma_r - \frac{\mu}{1-\mu}\sigma_\theta\right)$$

the radius of the plastic zone is:

$$R_p = r_0\left[\frac{(1 - \sin\varphi)(\sigma_0 + \sigma_p + C\cot\varphi)}{p_i + C\cot\varphi}\right]^{\frac{1-\sin\varphi}{2\sin\varphi}}$$

② when $\sigma_{pmax} < p_i$, the surrounding rock stress is:

$$\sigma^*_r = (p_i + C\cot\varphi)\left(\frac{r}{r_0}\right)^{\frac{2\sin\varphi}{1-\sin\varphi}} - C\cot\varphi;$$

$$\sigma^*_\theta = \frac{1 + \sin\varphi}{1 - \sin\varphi}(p_i + C\cot\varphi)\left(\frac{r}{r_0}\right)^{\frac{2\sin\varphi}{1-\sin\varphi}} - C\cot\varphi;$$

the radius of the plastic zone is:

$$R_d = r_0\left(\frac{2\sigma_{pmax} + C\cot\varphi}{p_i + C\cot\varphi}\right)^{\frac{1-\sin\varphi}{2\sin\varphi}};$$

the radial strain is:

$$\varepsilon^*_r = \varepsilon_r + D(N_d)$$

Generally, since the elastic strain of the surrounding rock is small and can be ignored compared with the expansive deformation of the rock, the tunnel displacement is:

$$S_0 = \int_{r_0}^{R_d} D(N_d) dr$$

at this time, the radius of the plastic zone is:

$$R_p = r_0\left[\frac{(2\sigma_0 + C\cot\varphi)(1 - \sin\varphi)}{(p_i + C\cot\varphi)(1 + \sin\varphi)}\right]^{\frac{1-\sin\varphi}{2\sin\varphi}}$$

(3) When the surrounding rock state before and after expansion are both plastic states, the radius of the plastic zone is:

$$R_d = r_0\left(\frac{\sigma_{pmax} + C\cot\varphi}{p_i + C\cot\varphi}\right)^{\frac{1-\sin\varphi}{2\sin\varphi}}$$

the surrounding rock stress is:

$$\sigma^*_r = 2(p_i + C\cot\varphi)\left(\frac{r}{r_0}\right)^{\frac{2\sin\varphi}{1-\sin\varphi}} - 2C\cot\varphi$$

$$\sigma^*_\theta = \frac{2\sin\varphi + 2}{1 - \sin\varphi}(p_i + C\cot\varphi)\left(\frac{r}{r_0}\right)^{\frac{2\sin\varphi}{1-\sin\varphi}} - \frac{2}{1 - \sin\varphi}C\cot\varphi$$

at this time, the tunnel displacement is:

$$S_0 = \frac{r_0\sin\varphi(\sigma_0 + C\cot\varphi)}{2G}\left[\frac{(1 - \sin\varphi)(\sigma_0 + C\cot\varphi)}{p_i + C\cot\varphi}\right]^{\frac{1-\sin\varphi}{\sin\varphi}} + \int_{r_0}^{R_d} D(N_d) dr$$

Embodiment 2

Taking the tunnel surrounding rock of gypsum expansive rock as an example, the excavation surface of the tunnel is circular. The tunnel radius $r_0 = 8$ m, the elastic modulus of the surrounding rock $E = 5$ GPa, the Poisson's ratio $m = 0.3$, Cohesion $C = 600$ kPa, among them, internal friction angle $j = 30°$, rock bulk density $g = 22$ kN/m³, buried depth $h = 200$ m.

The crustal stress is the self-weight of the rock, the stress of the tunnel surrounding rock is regarded as the hydrostatic pressure, the crustal stress $s_0 = gh = 22 \times 200 = 4.4$ MPa, the tunnel support force $p_i = 0.2$ MPa, the maximum rock expansive force $s_{pmax} = 0.8$ MPa, the maximum confining expansive strain is 0.01, and the total expansion energy $N_p$ is 40 MN.m. The above are the basic parameters of the surrounding rock.

(1) Judgment of surrounding rock state after tunnel lining is completed

Assuming that the surrounding rock is elastic state after the tunnel lining is completed, the stresses of the surrounding rock are:

$$\sigma_r = \sigma_0\left(1 - \frac{r_0^2}{r^2}\right) + p_i \frac{r_0^2}{r^2} = 4.4 - 268.8 \frac{1}{r^2}$$

$$\sigma_\theta = \sigma_0\left(1 + \frac{r_0^2}{r^2}\right) - p_i \frac{r_0^2}{r^2} = 4.4 + 268.8 \frac{1}{r^2}$$

According to the Mohr-Coulomb yielding criteria, the surrounding rock needs to meet the following requirements to enter the plastic state:

$$\sigma_\theta - \sigma_r \geq \frac{2\sin\varphi}{1 - \sin\varphi}(\sigma_r + C\cot\varphi)$$

which is $\sigma_\theta \geq 3\sigma_r + 2.08$ then:

$$4.4 + 268.8 \frac{2}{r^2} \geq 3\left(4.4 - 268.8 \frac{1}{r^2}\right) + 2.08$$

this solves:

$r \leq 9.94$

It can be seen that the tunnel surrounding rock should be in the plastic zone.

(2) Tunnel surrounding rock stress and displacement

According to the judgment result of the surrounding rock state after the tunnel lining is completed, the tunnel surrounding rock is plastic state, and the plastic zone radius is:

$$R_p = r_0\left[(1 - \sin\varphi)\frac{\sigma_0 + C\cot\varphi}{p_i + C\cot\varphi}\right]^{\frac{1-\sin\varphi}{2\sin\varphi}} = 11.85 \text{ m}$$

the medium stress state at a certain point in the plastic zone of the surrounding rock is:

$$\sigma_r = (p_i + C\cot\varphi)\left(\frac{r}{r_0}\right)^{\frac{2\sin\varphi}{1-\sin\varphi}} - C\cot\varphi = 0.0194r^2 - 1.04$$

$$\sigma_\theta = \frac{1 + \sin\varphi}{1 - \sin\varphi}(p_i + C\cot\varphi)\left(\frac{r}{r_0}\right)^{\frac{2\sin\varphi}{1-\sin\varphi}} - C\cot\varphi = 0.0581r^2 - 1.04$$

The displacement value of surrounding rock of tunnel wall is:

$$S_0 = \frac{r_0 \sin\varphi(\sigma_0 + C\cot\varphi)}{2G}\left[\frac{(1 - \sin\varphi)(\sigma_0 + C\cot\varphi)}{p_i + C\cot\varphi}\right]^{\frac{1-\sin\varphi}{\sin\varphi}} = 0.012 \text{ m}$$

(3) Consider tunnel surrounding rock expansion

The surrounding rock is in the plastic zone before expansion, and it is still plastic state after expansion. Firstly, determine the expansive deformation radius:

$$R_d = r_0\left(\frac{\sigma_{pmax} + C\cot\varphi}{p_i + C\cot\varphi}\right)^{\frac{1-\sin\varphi}{2\sin\varphi}} = 9.746 \text{ m}$$

For $r \leq R_d$, the total stress of the surrounding rock after expansion is:

$$\sigma_r^* = 2(p_i + C\cot\varphi)\left(\frac{r}{r_0}\right)^{\frac{2\sin\varphi}{1-\sin\varphi}} - 2C\cot\varphi = 0.0296r^2 - 2.08$$

$$\sigma_\theta^* = \frac{2\sin\varphi + 2}{1 - \sin\varphi}(p_i + C\cot\varphi)\left(\frac{r}{r_0}\right)^{\frac{2\sin\varphi}{1-\sin\varphi}} - \frac{2}{1 - \sin\varphi}C\cot\varphi = 0.11625r^2 - 4.16$$

the displacement due to the expansive strain is:

$$S_0 = \frac{r_0\sin\varphi(\sigma_0 + C\cot\varphi)}{2G}\left[\frac{(1 - \sin\varphi)(\sigma_0 + C\cot\varphi)}{p_i + C\cot\varphi}\right]^{\frac{1-\sin\varphi}{\sin\varphi}} + \int_{r_0}^{R_d} D(N_d)dr$$

the relationship between the expansion energy, the expansive stress and the expansive strain obeys the following:

$$\varepsilon_{ep} = D(N_d) = \left(\frac{N_d}{D}\right)^2$$

$$\sigma_p = S(N_3) = \frac{N_3}{S}$$

in the formula: D is strain conversion coefficient; S is stress conversion coefficient;

From the maximum expansive force of rock $s_{pmax}=0.8$ MPa, the maximum confined expansive strain is 0.01; the total expansion energy $N_p$ is 40 MN.m; it can be calculated:

$$\varepsilon_{ep} = D(N_d) = \left(\frac{N_d}{400}\right)^2$$

$$\sigma_p = S(N_s) = \frac{N_s}{50}$$

which is: $N_s = 50\sigma_p$.

Then for $r \leq R_d$, for the expansive force $\sigma_p = \sigma_r$ of any point, the expansive strain of this point is:

$$\varepsilon_{ep} = D(N_d) = \left(\frac{40 - 50\sigma_r}{400}\right)^2 = \left(\frac{40 - 50(0.0194r^2 - 1.04)}{400}\right)^2 =$$

$$(0.1 - 0.125(0.0194r^2 - 1.04))^2 = (0.23 - 0.002425r^2)^2$$

therefore:

$$\int_{r_0}^{R_d} D(N_d)dr = \int_8^{9.746}(0.23 - 0.002425r^2)^2 dr =$$

$$\left(\frac{28227r^5 - 8924000r^3 + 1269600000r}{24000000000}\right)_8^{9.746} = 0.0034$$

therefore, the total displacement of the surrounding rock after expansion is:

$$S_0=0.012+0.0034=0.0154m$$

Embodiment 3

The tunnel surrounding rock is gypsum expansive rock, the excavation surface of the tunnel is circular. The radius of the tunnel $r_0=8$ m, the elastic modulus of the surrounding rock E=5 GPa, the Poisson's ratio m=0.3, and the cohesion C=700 kPa, the internal friction angle j=35°.

The stress of the tunnel surrounding rock is regarded as the hydrostatic pressure, the ground stress $s_0=gh=2.0$ MPa, the tunnel support force $p_i=0.3$ MPa, the maximum rock expansive force $s_{pmax}=0.9$ MPa, and the maximum confined expansive strain is 0.09; the total expansion energy $N_p$ is 90 MN.m, and the above are the basic parameters of surrounding rock.

(1) Judgment of surrounding rock state after tunnel lining is completed

Assuming that the surrounding rock is elastic state after the tunnel lining is completed, the stresses of the surrounding rock are:

$$\sigma_r = \sigma_0\left(1 - \frac{r_0^2}{r^2}\right) + p_i\frac{r_0^2}{r^2} = 2.0 - 108.8\frac{1}{r^2}$$

$$\sigma_\theta = \sigma_0\left(1 + \frac{r_0^2}{r^2}\right) - p_i\frac{r_0^2}{r^2} = 2.0 + 108.8\frac{1}{r^2}$$

According to the Mohr-Coulomb yielding criteria, the surrounding rock needs to meet the following requirements to enter the plastic state:

$$\sigma_\theta - \sigma_r \geq \frac{2\sin\varphi}{1-\sin\varphi}(\sigma_r + C\cot\varphi)$$

which is $$\sigma_\theta \geq \frac{1+\sin\varphi}{1-\sin\varphi}\sigma_r + \frac{2\sin\varphi}{1-\sin\varphi}C\cot\varphi = 3.7\sigma_r + 2.7$$

then:

$$2.0 + 108.8\frac{1}{r^2} \geq 3.7\left(2.0 - 108.8\frac{1}{r^2}\right) + 2.7$$

this solves:

$$511.36 \geq 8.1r^2$$

which is $$r \leq 7.945$$

It can be seen that the tunnel surrounding rock should be in the elastic zone.

(2) Tunnel surrounding rock stress and strain

According to the judgment results of the surrounding rock state after the tunnel lining is completed, the tunnel surrounding rock is elastic state, and the medium stress state at a certain point in the plastic zone of the surrounding rock is:

$$\sigma_r = 2.0 - 108.8\frac{1}{r^2}$$

$$\sigma_\theta = 2.0 + 108.8\frac{1}{r^2}$$

The strain at any point in the surrounding rock is:

$$\varepsilon_r = \frac{0.13}{5000}\left(8 - 1088\frac{1}{r^2}\right)$$

$$\varepsilon_\theta = \frac{0.13}{5000}\left(1088\frac{1}{r^2} - 8\right)$$

(3) Consider tunnel surrounding rock expansion

1) Firstly, the calculated value of the plastic zone radius is used to judge whether the surrounding rock is an elastic state or a plastic state after expansion. Since the maximum expansive force is larger than the supporting force of tunnel lining, the plastic zone radius is calculated as follows:

$$R_p = r_0\left[\frac{2\sigma_0 + C\cot\varphi)(1-\sin\varphi)}{(p_i + C\cot\varphi)(1+\sin\varphi)}\right]^{\frac{1-\sin\varphi}{2\sin\varphi}} = 8.125m$$

Since: $R_p=8.125>r_0=8.0$,

The rock enters a plastic state after expansion.

2) Expansive deformation radius:

$$R_d = r_0\left(\frac{2\sigma_{pmax} + C\cot\varphi}{p_i + C\cot\varphi}\right)^{\frac{1-\sin\varphi}{2\sin\varphi}} = 10.9m$$

3) The total stress state of surrounding rock in the plastic zone is:

$$\sigma_r^* = (p_i + C\cot\varphi)\left(\frac{r}{r_0}\right)^{\frac{2\sin\varphi}{1-\sin\varphi}} - C\cot\varphi = 0.0047r^{2.7} - 1$$

$$\sigma_\theta^* = \frac{1+\sin\varphi}{1-\sin\varphi}(p_i + C\cot\varphi)\left(\frac{r}{r_0}\right)^{\frac{2\sin\varphi}{1-\sin\varphi}} - C\cot\varphi = 0.0175r^{2.7} - 1$$

4) Displacement of tunnel surrounding rock

The relationship between the expansion energy, the expansive stress, and the expansive strain is the same as that in Embodiment 2, and it can be known that $D(N_d)$ is:

$$\varepsilon_{ep} = D(N_d) = \left(\frac{90-100\sigma_r}{300}\right)^2 = \left(0.3 - \frac{1}{3}\left(2.0 - 108.8\frac{1}{r^2}\right)\right)^2;$$

According to the displacement calculation formula:

$$S_0 = \int_{r_0}^{R_d} D(N_d)dr = \int_8^{10.585}\left(0.3 - \frac{1}{3}\left(2.0 - 108.8\frac{1}{r^2}\right)\right)^2 dr =$$

$$\left(\frac{12100r^4 + 2393820r^3 - 39465387}{90000r^2}\right)_8^{10.9} = 0.0232m$$

The above description is merely a preferred embodiment of the present disclosure, and is not intended to limit the present disclosure. For the person skilled in the art, various changes and variations can be made to the present disclosure. Any modifications, equivalent replacements and improvements made within the spirit and principle of the present disclosure, all should be within the scope of protection of the present disclosure.

We claim:

1. A method for analyzing expansive stress and expansive strain of tunnel surrounding rock, comprising:
   (1) determining surrounding rock state of tunnel surrounding rock before and after expansion, wherein the surrounding rock state of the tunnel surrounding rock before and after expansion are both elastic state; or the surrounding rock state of the tunnel surrounding rock before expansion is elastic state and the surrounding rock state of the tunnel surrounding rock after expansion is plastic state; or the surrounding rock state of the tunnel surrounding rock before and after expansion are both plastic states;
   (2) according to the determined surrounding rock state, determining expansive stress and expansive strain of the tunnel surrounding rock before and after expansion; and
   (3) according to the surrounding rock state of the tunnel surrounding rock after expansion, determining expansive deformation radius of the tunnel surrounding rock, so as to determine die-expansive deformation displacement of the tunnel surrounding rock based on the expansive deformation radius of the tunnel surrounding rock and the expansive strain of the tunnel surrounding rock after expansion;
   wherein, the expansive deformation radius of the tunnel surrounding rock is the following distance:
   after the expansion of the tunnel surrounding rock, within the distance of the expansive deformation radius from the tunnel wall, the tunnel surrounding rock occurs both expansive strain and expansive stress; beyond the distance of the expansive deformation radius from the tunnel wall, the tunnel surrounding rock only occurs expansive stress without expansive strain; and, at the distance of the expansive deformation radius from the tunnel wall, the expansive stress of the tunnel surrounding rock is equal to the ground stress.

2. The method of claim 1, wherein determining the surrounding rock state of the tunnel surrounding rock before expansion comprises:
   (1) in the case that the surrounding rock state of the tunnel surrounding rock after die-lining is completed is elastic state, determining the expansive stress of the tunnel surrounding rock;
   (2) according to Mohr-Coulomb yielding criteria, calculating numerical range of surrounding rock radius that needs to be satisfied by the surrounding rock state of the tunnel surrounding rock to enter the plastic state; and
   (3) comparing tunnel radius and the surrounding rock radius, when maximum value of the numerical range is larger than the tunnel radius, the surrounding rock state of the tunnel surrounding rock before expansion is plastic state, and when maximum value of the numerical range is smaller than the tunnel radius, the surrounding rock state of the tunnel surrounding rock before expansion is elastic state.

3. The method of claim 1, wherein determining the surrounding rock state of the tunnel surrounding rock after expansion comprises:
   (1) calculating plastic zone radius of the tunnel surrounding rock; and
   (2) comparing the plastic zone radius with tunnel radius, and when the plastic zone radius is larger than the tunnel radius, determining the surrounding rock state of the tunnel surrounding rock after expansion is plastic state.

4. The method of claim 1, wherein, in die-A case that the surrounding rock state of the tunnel surrounding rock before and after expansion are both elastic states,
   determining the expansive deformation radius $R_d$ of the tunnel surrounding rock according to the following formula:

$$R_d = r_0 \left( \frac{\sigma_0 - p_i}{\sigma_0 - \sigma_{pmax}} \right)^{0.5}$$

wherein,
   $r_0$ is tunnel radius,
   $\sigma_0$ is crustal stress of the tunnel surrounding rock,
   $p_i$ is lining support force provided by the tunnel support structure to the tunnel surrounding rock,
   $\sigma_{pmax}$ is maximum expansive force of the tunnel surrounding rock;
   determining the expansive stress of the tunnel surrounding rock after expansion at the expansive deformation radius $R_d$ according to the following formula:

$$\sigma^*_r = 2\sigma_r$$

$$\sigma^*_\theta = 2\sigma_0$$

wherein,
   $\sigma^*_r$ is total radial stress of the tunnel surrounding rock at the expansive deformation radius $R_d$,
   $\sigma_r$ is radial stress of the tunnel surrounding rock after crustal stress balance at the expansive deformation radius $R_d$,
   $\sigma^*_\theta$ is total tangential stress of the tunnel surrounding rock at the expansive deformation radius $R_d$;
   determining the expansive strain of the tunnel surrounding rock after expansion according to the following formula:

$$\varepsilon^*_r = \varepsilon_r + D(N_d)\varepsilon_{ep}$$

wherein,
   $\varepsilon_r$ is radial linear strain of the tunnel surrounding rock in a condition of the crustal stress,
   $\varepsilon^*_r$ is total radial strain of the tunnel surrounding rock,
   Nd is the capacity of the corresponding expansive deformation part of the tunnel surrounding rock during expansion,
   $D(N_d)\varepsilon_{ep}$ is the sum of the expansive strain of the tunnel surrounding rock after expansion and the expansive strain generated by the expansive stress of the tunnel surrounding rock after expansion.

5. The method of claim 1, wherein, in the case that the surrounding rock state of the tunnel surrounding rock before expansion is elastic state and the surrounding rock state of the tunnel surrounding rock after expansion is plastic state, and a condition for the tunnel surrounding rock to enter the plastic state is the Mohr-Coulomb yielding criteria $$\sigma_\theta - \sigma_r \geq \frac{2\sin\varphi}{1 - \sin\varphi}(\sigma_r + C\cot\phi),$$

determining the expansive stress of the tunnel surrounding rock after expansion at the expansive deformation radius $R_d$ according to the following formula:

$$\sigma_r^* = (p_i + C\cot\varphi)\left(\frac{r}{r_0}\right)^{\frac{2\sin\varphi}{1-\sin\varphi}} - C\cot\varphi$$

$$\sigma_\theta^* = \frac{1+\sin\varphi}{1-\sin\varphi}(p_i + C\cot\varphi)\left(\frac{r}{r_0}\right)^{\frac{2\sin\varphi}{1-\sin\varphi}} - C\cot\varphi$$

wherein,
$\sigma^*_r$ is total radial stress of the tunnel surrounding rock at the expansive deformation radius $R_d$,
$\sigma^*_\theta$ is total tangential stress of the tunnel surrounding rock at the expansive deformation radius $R_d$,
$\varphi$ is internal friction angle of the tunnel surrounding rock,
$p_i$ is lining support force provided by the tunnel support structure to the tunnel surrounding rock,
C is cohesion of the tunnel surrounding rock,
$r_0$ is tunnel radius,
r is radius of the tunnel surrounding rock;
when the maximum lateral confinement $\sigma_{pmax}$ of the expansive stress of the tunnel surrounding rock after expansion is smaller than the lining support force $p_i$ provided by the tunnel support structure to the tunnel surrounding rock, determining the plastic zone radius $R_p$ according to the following formula:

$$R_p = r_0\left[\frac{(1-\sin\varphi)(\sigma_0 + \sigma_p + C\cot\varphi)}{p_i + C\cot\varphi}\right]^{\frac{1-\sin\phi}{2\sin\phi}}$$

wherein,
$r_0$ is the tunnel radius,
$\varphi$ is the internal friction angle of the tunnel surrounding rock,
$p_i$ is the lining support force provided by the tunnel support structure to the tunnel surrounding rock,
C is the cohesion of the tunnel surrounding rock,
$\sigma_0$ is crustal stress of the tunnel surrounding rock,
$\sigma_p$ is expansive force of the tunnel surrounding rock;
when the maximum lateral confinement $\sigma_{pmax}$ of the expansive stress of the tunnel surrounding rock after expansion is larger than or equal to the lining support force $p_i$ provided by the tunnel support structure to the tunnel surrounding rock, determining the expansive deformation radius $R_d$ of the tunnel surrounding rock according to the following formula:

$$R_d = r_0\left(\frac{2\sigma_{pmax} + C\cot\varphi}{p_i + C\cot\varphi}\right)^{\frac{1-\sin\varphi}{2\sin\varphi}}$$

wherein,
$r_0$ is the tunnel radius,
$\varphi$ is the internal friction angle of the tunnel surrounding rock,
$p_i$ is the lining support force provided by the tunnel support structure to the tunnel surrounding rock,
C is the cohesion of the tunnel surrounding rock,
$\sigma_{pmax}$ is a maximum expansive force of the tunnel surrounding rock;

determining the plastic zone radius $R_p$ according to the following formula:

$$R_p = r_0\left[\frac{(2\sigma_0 + C\cot\varphi)(1-\sin\varphi)}{(p_i + C\cot\varphi)(1+\sin\varphi)}\right]^{\frac{1-\sin\varphi}{2\sin\varphi}}$$

wherein,
$r_0$ is the tunnel radius,
$\varphi$ is the internal friction angle of the tunnel surrounding rock,
$p_i$ is the lining support force provided by the tunnel support structure to the tunnel surrounding rock,
C is the cohesion of the tunnel surrounding rock,
$\sigma_0$ is crustal stress of the tunnel surrounding rock;
determining the expansive deformation displacement $S_0$ of the tunnel surrounding rock according to the following formula:

$$S_0 = \int_{r_0}^{R_d} D(N_d) dr$$

wherein,
$R_d$ is the expansive deformation radius,
$r_0$ is the tunnel radius,
$D(N_d)$ is the expansive strain of the tunnel surrounding rock after expansion.

6. The method of claim 1, wherein the surrounding rock state of the tunnel surrounding rock before and after expansion are both plastic states,
determining the expansive stress of the tunnel surrounding rock at the expansive deformation radius $R_d$ after expansion according to the following formula:

$$\sigma_r^* = 2(p_i + C\cot\varphi)\left(\frac{r}{r_0}\right)^{\frac{2\sin\varphi}{1-\sin\varphi}} - 2C\cot\varphi$$

$$\sigma_\theta^* = \frac{2\sin\varphi + 2}{1-\sin\varphi}(p_i + C\cot\varphi)\left(\frac{r}{r_0}\right)^{\frac{2\sin\varphi}{1-\sin\varphi}} - \frac{2}{1-\sin\varphi}C\cot\varphi$$

wherein,
$\sigma^*_r$ is total radial stress of the tunnel surrounding rock at the expansive deformation radius $R_d$,
$\sigma^*_\theta$ is total tangential stress of the tunnel surrounding rock at the expansive deformation radius $R_d$;
$\varphi$ is internal friction angle of the tunnel surrounding rock,
$p_i$ is lining support force provided by the tunnel support structure to the tunnel surrounding rock,
C is cohesion of the tunnel surrounding rock,
$r_0$ is tunnel radius,
r is radius of the tunnel surrounding rock;
determining the expansive deformation displacement $S_0$ of the tunnel surrounding rock according to the following formula:

$$S_0 = \frac{r_0 \sin\varphi(\sigma_0 + C\cot\varphi)}{2G}\left[\frac{(1-\sin\varphi)(\sigma_0 + C\cot\varphi)}{p_i + C\cot\varphi}\right]^{\frac{1-\sin\varphi}{\sin\varphi}} + \int_{r_0}^{R_d} D(N_d)dr$$

wherein,
$R_d$ is the expansive deformation radius,
$r_0$ is the tunnel radius,
$\varphi$ is the internal friction angle of the tunnel surrounding rock, $p_i$ is the lining support force provided by the tunnel support structure to the tunnel surrounding rock,
C is the cohesion of the tunnel surrounding rock,
$\sigma_0$ is crustal stress of the tunnel surrounding rock,
$D(N_d)$ is the expansive strain of the tunnel surrounding rock after expansion,
G is shear modulus of the tunnel surrounding rock.

* * * * *